United States Patent [19]

Adler

[11] 3,850,030

[45] Nov. 26, 1974

[54] APPARATUS FOR MEASURING THE TORSION OF A ROTATING SHAFT

[75] Inventor: Alan J. Adler, Palo Alto, Calif.

[73] Assignee: Acurex Corporation, Mountain View, Calif.

[22] Filed: Oct. 1, 1973

[21] Appl. No.: 402,024

[52] U.S. Cl. .............................. 73/136 A
[51] Int. Cl. .............................. G01l 3/10
[58] Field of Search ........... 73/136 A, 136 B, 136 C

[56] References Cited
UNITED STATES PATENTS

| | | | |
|---|---|---|---|
| 2,566,566 | 9/1951 | Howes | 73/136 A |
| 3,521,484 | 7/1970 | Dybvad et al. | 73/88.5 R |
| 3,577,779 | 5/1971 | Laimins | 73/141 A |
| 3,584,505 | 6/1971 | Seligmann | 73/136 A X |
| 3,625,053 | 12/1971 | Laimins | 73/88.5 R |
| 3,797,305 | 3/1974 | Haskell | 73/136 A |

Primary Examiner—Charles A. Ruehl
Attorney, Agent, or Firm—Flehr, Hohbach, Test, Albritton & Herbert

[57] ABSTRACT

A marine torsiometer includes a pair of spaced collars clamped to a rotating propulsion shaft with a link affixed to the two collars to sense torsion in the shaft. The link includes two waist portions with strain gauges affixed thereto and connected in an electrical bridge configuration to cancel out the effects of bending and provide an electrical indication of torsion only. A transmitter is mounted on the link and converts the electrical indication to an FM radio frequency which is coupled to a stationary receiver through a rotary transformer. The power to the bridge circuit is also coupled through the rotary transformer.

2 Claims, 7 Drawing Figures

APPARATUS FOR MEASURING THE TORSION OF A ROTATING SHAFT

BACKGROUND OF THE INVENTION

The present invention is directed in general to apparatus for measuring the torsion of a rotating shaft and more particularly to a marine torsionmeter.

With the advent of a new generation of ships employing variable pitch propellers an accurate means of determining transient shaft torques and also horsepower is necessary. However, such means must meet several requirements. These include:

1. There can be no modification to the shaft such as drilling or welding.
2. Accuracy must be maintained over the entire speed range (including zero speed) and in addition calibration must be maintained.
3. The system must perform properly during temporary immersion in seawater.
4. The system must continue to function when subjected to high impact shocks (for example, adequate clearance must be provided).
5. The system must eliminate the effect of shaft bending.

Three general types of marine torsionmeters are available. None of them meet all of the above requirements as will be discussed below.

The magneto-elastic torsiometer was developed for use in large industrial rolling mills. Its principle of operation is to measure the torsion produced distortion of alternating magnetic fields which are electrically induced in the shaft. Since sensing is accomplished by a magnetic collar which surrounds but does not contact the shaft, this is a type of noncontact measurement. The magneto-elastic system, however, exhibits poor calibration stability because the magnetic characteristics of the shaft itself are not stable and shift due to normal torsional working. Calibration can deteriorate even over a short period of time and unfortunately the only convenient method of verifying calibration is by repeating the initial costly and time consuming calibration procedure.

A second type of torsiometer is termed the linear voltage differential transformer (LVDT) type. Here two collars are clamped to the shaft in a cantilever fashion so that they contact the shaft at only two narrow annular zones typically 48 inches apart. The remaining portions of the collars which do not contact the shaft couple the shaft twist to a LVDT which is a linear motion sensing transducer. This transducer is coupled to a readout circuit by slip rings which are major weakness in the system due to their limited reliability and short life. The steel collars are also excessively heavy.

A third torsiometer is termed the magnetic gear torsiometer which consists of two gear rings which clamp to the shaft at narrow annular zones one to two meters apart. Stationary magnetic transducers sense the gear teeth and produce a relative phase angle which is proportional to the amount of twist in the shaft. In the unimproved type of magnetic gear torsiometer, relatively large errors in torque readings are caused by small positional shifts of the stationary magnetic transducers. Improved models where the two gears are placed closer together by means of a cantilever arrangement have improved accuracy; resistance to high impact shock conditions is still poor.

The foregoing torsiometers have been specifically used in harsh marine environments. Other types of torque measuring apparatus for large rotating shafts include Ruge U.S. Pat. No. 2,392,293. Here a bridge consisting of four strain gauges is utilized, the bridge eliminating the effect of bending which usually occur in a shaft. The Ruge technique in which the strain gauges are applied directly to the shaft is too delicate to be used in a marine environment, however.

Two other patents, namely Laimins, U.S. Pat. No. 3,625,053 and Dybvad, U.S. Pat. No. 3,521,484 both show strain gauges utilized to sense bending or side load in specifically an aircraft wheel. Both Laimins and Dybvad are directed to transducers used in the interior of a shaft. Laimins is pertinent in that it illustrates a bridge arrangement of transducers where the transducers are located as illustrated in FIG. 2 on thin flexible portions of a shaft. The bridge arrangement eliminates forces due to bending as opposed to shear type deflection. The Dybvad patent also illustrates a bridge type arrangement of strain gauges as illustrated in FIG. 3 where a protective bellows is disclosed. These patents, however, are inapplicable due to the fact that they measure shaft bending rather than torsion, and are located in the shaft interior which is unavailable on most marine shafts.

OBJECTS AND SUMMARY OF THE INVENTION

It is, therefore an object of the invention to provide improved apparatus for measuring torsion of a rotating shaft which meets all of the foregoing requirements including high accuracy and good performance in adverse ambient conditions.

In accordance with the foregoing object there is provided apparatus for measuring the torsion of a rotating shaft. A pair of spaced collars are clamped onto the shaft and rotatable therewith. A unitary elongated link bridges the two collars and lies substantially parallel to the axis of rotation of the shaft. Each end of the link is rigidly affixed to the respective collars. Transducer means are affixed to the link which is communicated to a fixed receiver.

DETAILED DESCRIPTION OF THE PREFERRED EMBODIMENT

Figure 1:
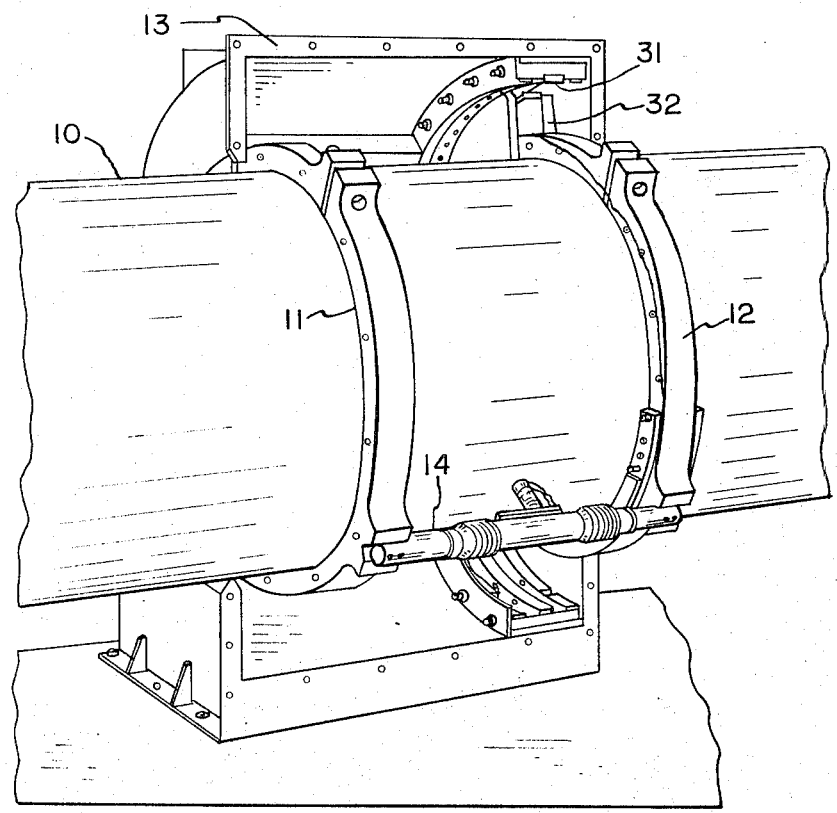
FIG. 1 is a perspective view partially cut away of the torsiometer of the present invention as it is assembled on a propulsion shaft.
Figure 2:
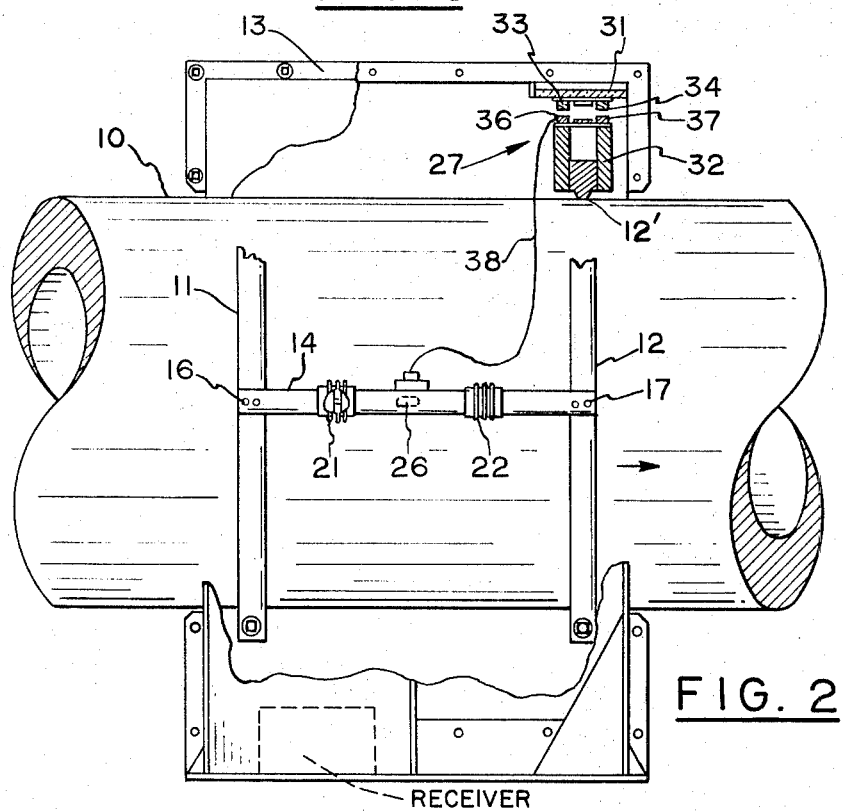
FIG. 2 is a simplified elevation view of FIG. 1.

Referring now to FIGS. 1 and 2, the torsiometer of the present invention is normally assembled on a large diameter propulsion shaft 10. A pair of spaced collars 11 and 12 are clamped on the shaft and maintained in position by, for example as shown in the case of collar 12, a knife edge 12'. The assembly of FIGS. 1 and 2 is shown with one-half of the housing 13 removed.

Figure 4:
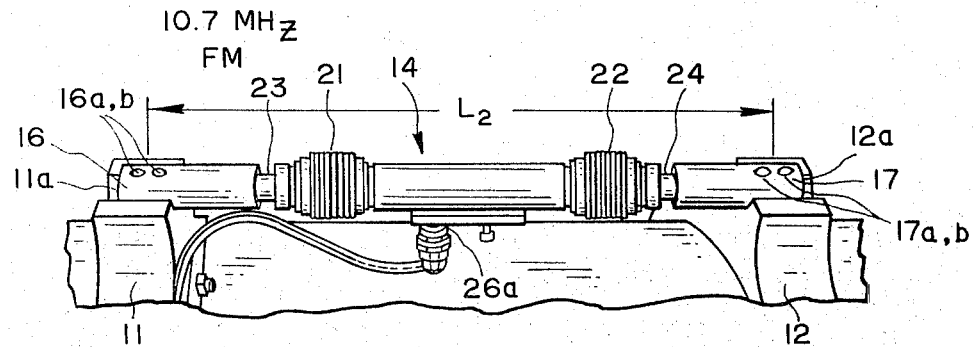
FIG. 4 is an enlarged perspective view of a portion of FIG. 1.

Bridging collars 11 and 12 is a unitary elongated link 14. Link 14 lies substantially parallel to the axis of rotation of the shaft and each end of the link, namely, 16 and 17, are rigidly affixed to the respective collars 11, 12. This is best shown in FIG. 4 where end 16 is retained in a notch 11a by the two fasteners 16a, b and end 17 is retained in notch 12a by the fasteners 17a, b.

Figure 3:
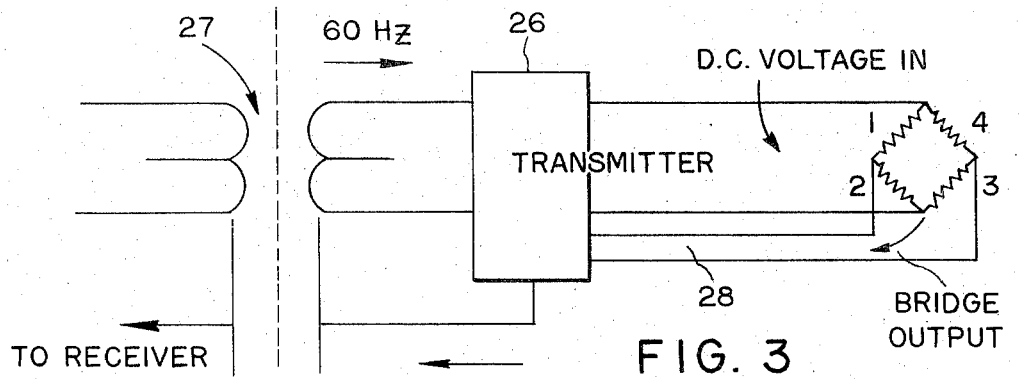
FIG. 3 is an electrical schematic of the circuit used in conjunction with FIG. 1.
Figure 5A:
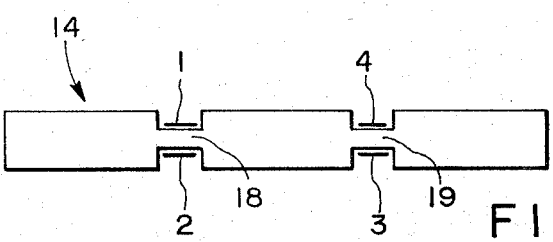
FIGS. 5A, 5B and 5C are simplified views of a portion of FIG. 4 in various operating conditions.

The link 14 as illustrated in FIG. 5A includes two spaced waist portions 18 and 19 of reduced cross-section which have affixed to them the four strain gauges 1, 2, 3 and 4. These are electrically connected in a bridge configuration as illustrated in FIG. 3. The strain gauges are protected from the ambient atmosphere by the bellows 21 shown in FIG. 4 for strain gauges 1 and 2 and bellows 22 for strain gauges 3 and 4. Link 14 also includes necked down portions 23 and 24 which are not illustrated in the simplified drawings of FIGS. 5A, 5B and 5C.

Figure 5B:
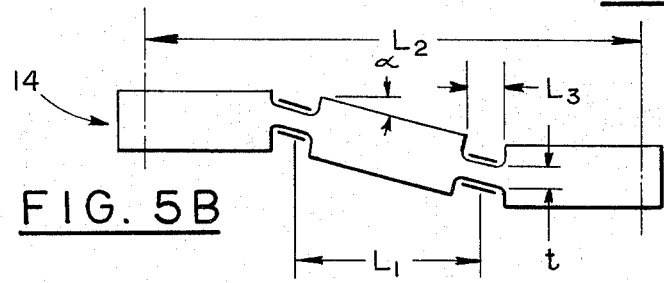
Figure 5C:
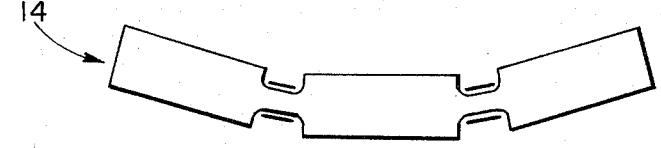

FIG. 5B illustrates the effective shaft torsion (greatly exaggerated) where the bridge as illustrated in FIG. 3 provides for additive outputs. FIG. 5C illustrates the shaft bending (also exaggerated) where the strain gauge outputs cancel each other.

Referring now to FIG. 3, the bridge circuit 1, 2, 3 and 4 is provided a dc input voltage by a transmitter 26 which receives a 60 Hz input voltage through a rotary transformer 27. Transmitter 26 also receives the output of the bridge circuit on line pair 28 which is, of course, an electrical signal indicative of shaft torsion. Such signal is FM modulated with a carrier frequency of 10.7 MHz and coupled through rotary transformer 27 to a receiver which would be normally located in the housing 13. Transmitter 26 is mounted in link 14 at approximately the location 26a illustrated in FIGS. 2 and 4. It is a standard, off-the-shelf transmitter designated model 1206 of Acurex Corporation, the assignee of the present application.

The rotary transformer 27 which provides a noncontacting means for supplying the bridge both with power and for receiving the electrical indication of shaft torsion is shown in greater detail in both FIGS. 1 and 2. It includes a stator portion 31 and a rotor portion 32. Magnetic pole pieces are provided by conducting rings 33 and 34 which are placed opposite the rotating rings 36 and 37 mounted on rotor 32. Conductive leads 38 couple both power to the transmitter 26 as illustrated in FIG. 2 and the radio frequency signal from the transmitter to the rotary transformer 27. Thus, the transformer core pieces while serving as a typical 60 cycle power transformer to drive the bridge circuit also serve as capacitor elements to couple the FM pulse modulated output signal to the stationary readout circuitry. The readout circuitry which includes the receiver is housed in a water-proof compartment in the stationary housing 13 illustrated in dashed outline.

The rotating micro-circuit in transmitter 26 contains a voltage regulator which makes the system insensitive to variations in the transformer coupling. The use of FM/pulse modulation provides similar insensitivity for the output signal.

From a design standpoint and now referring to FIG. 5B, the various dimensions illustrated may be optimized as follows. The amount of twist in the propulsion shaft 10 is calculated as follows:

$$\theta = 2TL_2/\pi(r_1^4 - r_4^2) G \quad (1)$$

where
$\theta$ = twist angle in radians
T = applied torque
$L_2$ = distance between knife edges (See FIG. 4)
$r_1$ = radius of shaft outer surface
$r_2$ = radius of shaft bore, if hollow
G = shaft modulus of rigidity at 20°C. temperature The shaft twist angle $\theta$ must be converted to linear tangential shear motion ($\Delta$) by $$\Delta = \theta r_3 \quad (2)$$

where $r_3$ is the distance from the shaft center line to the transducer center line. The angle $\alpha$ as illustrated in FIG. 5B is $$\alpha = \Delta L_2/L_1 \quad (3)$$

where $L_1$ is the distance between strain gauges or rather between the waist portions 18 and 19 of the link 14. The strain level $\epsilon$ in the individual gauges is $$\epsilon = \alpha t/2L_3 \quad (4)$$

where $t$ is the flexure thickness of waist portions 18 and 19 and $L_3$ is the flexure length.

With the strain gauges of the present invention the best strain level, $\epsilon$, for maximum signal consistent with good long term fatigue immunity is $5 \times 10^{-4}$. Assuming a design of $t$ equal to 0.125 inches and $L_3$ equal to 3.410 inches from equation 4, $\alpha$ must be $3.28 \times 10^{-3}$ radians. Thus $L_1$ and $L_2$ as illustrated in equation (3) are chosen in order to achieve an optimum $\alpha$.

Thus, the present invention has provided an improved marine torsiometer which when built and tested provided the following results:
1. Accuracy of ±0.25 percent.
2. High impact shock testing did not cause any deterioration in the above accuracy.
3. No maintenance is required.
4. The system is virtually insensitive to shaft movements, variations in temperature and power line voltage.
5. The system is insensitive to shaft speed variations, and full accuracy is obtained even at 0 rpm.
6. Speed of response is dc to 500 Hz.
7. The system is of a simple and economical design with a mean time between failures of 42,000 hours.

I claim:
1. A torsionmeter for measuring the torque of a large diameter rotating shaft under adverse ambient conditions comprising: a pair of spaced collars clamped onto said shaft and rotatable therewith; a unitary elongated link bridging said two collars and lying substantially parallel to the axis of rotation of said shaft, each end of said link being rigidly affixed to respective collars; strain gauge means electrically connected to a bridge and affixed to said link so that said bridge cancels the effect of shaft bending but provides an electrical indication of shaft torsion, said link including a pair of spaced waist portions of reduced cross-section and said strain gauge means being affixed to said waist portions; and mechanically noncontacting means for supplying said bridge with power and for receiving said electrical indication of shaft torsion.

2. A torsiometer as in claim 1 where the ratio of the spacing of said collars with said spacing of said waist portions is selected to optimize said electrical indication of shaft torsion.

* * * * *